(12) United States Patent
Stadler (10) Patent No.: US 11,969,971 B2
(45) Date of Patent: Apr. 30, 2024

(54) ORIENTED STRAND BOARD, PROCESS FOR PRODUCTION OF AN ORIENTED STRAND BOARD AND APPARATUS FOR PRODUCING AN ORIENTED STRAND BOARD

(71) Applicant: Kronospan Luxembourg S.A., Sanem (LU)

(72) Inventor: Peter Stadler, Sanem (LU)

(73) Assignee: KRONOSPAN LUXEMBOURG S.A., Sanem (LU)

( * ) Notice: Subject to any disclaimer, the term of this patent is extended or adjusted under 35 U.S.C. 154(b) by 0 days.

(21) Appl. No.: 16/626,201

(22) PCT Filed: Jul. 20, 2017

(86) PCT No.: PCT/EP2017/068428
§ 371 (c)(1),
(2) Date: Dec. 23, 2019

(87) PCT Pub. No.: WO2019/007538
PCT Pub. Date: Jan. 10, 2019

(65) Prior Publication Data
US 2020/0122438 A1   Apr. 23, 2020

(30) Foreign Application Priority Data

Jul. 3, 2017 (DE) .................... 20 2017 103 956.0

(51) Int. Cl.
*B32B 21/02* (2006.01)
*B27N 3/00* (2006.01)
(Continued)

(52) U.S. Cl.
CPC .............. *B32B 21/02* (2013.01); *B27N 3/007* (2013.01); *B27N 3/002* (2013.01); *B27N 3/143* (2013.01);
(Continued)

(58) Field of Classification Search
CPC .......... B32B 21/02; B32B 7/12; B32B 21/13; B32B 2260/026; B32B 2260/046;
(Continued)

(56) References Cited

U.S. PATENT DOCUMENTS

2013/0292077 A1* 11/2013 Baroux ................... B32B 5/26
   162/159
2015/0354143 A1* 12/2015 Pike ....................... B32B 21/02
   162/164.6
2016/0001323 A1*  1/2016 Thole ...................... B32B 5/16
   427/393

FOREIGN PATENT DOCUMENTS

AU    2010209995 A1    2/2011
CN     101450504 B     6/2009
(Continued)

OTHER PUBLICATIONS

Machine Translation of DE 100 24 543 A1. (Year: 2001).*
(Continued)

*Primary Examiner* — Brian Handville
(74) *Attorney, Agent, or Firm* — Crowell & Moring LLP (57) ABSTRACT

A novel oriented strand board (OSB) may be provided comprising recycled wood flakes that have been obtained by flaking of recycled wood at least in a core layer. A process may be provided for producing a corresponding oriented strand board. An apparatus may be provided by which the oriented strand board can be produced.

16 Claims, 5 Drawing Sheets

(51) Int. Cl.
*B27N 3/14* (2006.01)
*B32B 7/12* (2006.01)
*B32B 21/13* (2006.01)

(52) U.S. Cl.
CPC ............... *B32B 7/12* (2013.01); *B32B 21/13* (2013.01); *B32B 2260/026* (2013.01); *B32B 2260/046* (2013.01)

(58) Field of Classification Search
CPC ............ B32B 2250/03; B32B 2250/05; B32B 2307/72; B32B 2307/732; B32B 2479/00; B32B 2607/00; B32B 7/02; B32B 7/04; B32B 3/04; B27N 3/007; B27N 3/002; B27N 3/143; B27N 3/00; B27N 3/14
See application file for complete search history.

(56) References Cited

FOREIGN PATENT DOCUMENTS

| | | |
|---|---|---|
| CN | 101653959 A | 2/2010 |
| CN | 102310453 A | 1/2012 |
| CN | 106346589 A | 1/2017 |
| DE | 42 24 629 A1 | 1/1994 |
| DE | 197 51 326 A1 | 5/1999 |
| DE | 100 24 543 A1 | 11/2001 |
| DE | 10024543 A1 | 11/2001 |
| DE | 101 30 526 A1 | 1/2003 |
| DE | 10 2008 059 527 A1 | 6/2010 |
| EP | 2 216 149 A1 | 2/2010 |
| RU | 2534263 C1 | 11/2014 |
| RU | 2607328 C1 | 1/2017 |
| WO | WO 03/095167 A1 | 11/2003 |
| WO | WO 2003/095167 A1 | 11/2003 |
| WO | WO 03095167 A1 | 11/2003 |
| WO | WO 2012/001483 A1 | 1/2012 |
| WO | WO 2012001483 A1 | 1/2012 |

OTHER PUBLICATIONS

International Search Report, issued in International Application No. PCT/EP2017/068428, dated Mar. 28, 2018, pp. 1-3, European Patent Office, Rijswijk, Netherlands.
"Altholzverordnung vom Aug. 15, 2002," "Verordnung über Anforderungen and die Verwertung und Beseitigung von Altholz (Altholzverordnung—AltholzV)", with English translation "Ordinance on requirements for recycling and disposal of watse wood (waste wood regulation—waste wood regulation)", dated Aug. 15, 2002, pp. 1-16, German Federal Law Gazette, published by Bundesanzeiger Verlagsgesellschaft GmbH.

Russian Search Report with English translation, issued in Russian application 2019140300/10, dated Oct. 15, 2020, pp. 1-4, Federal Service for Intellectual Property, Moscow, Russia.
Russian Office Action with English translation, dated Oct. 15, 2020, pp. 1-9, Russian Patent Application No. 2019140300/10(078990), Patent Office of The Russian Federation, Moscow, Russia.
Chinese Office Action with English translation for Chinese Patent application No. 2017800929166, dated May 6, 2021, pp. 1-38, China National Intellectual Property Administration, Beijing, People's Republic of China.
Canadian Office Action for Canadian Patent application No. 3065130, dated Jun. 29, 2021, pp. 1-4, Canadian Intellectual Property Office, Gatineau, Quebec K1A0C9.
L. A. Soltis et al., U.S. Department of Agriculture, Forest Service, Forest Products Laboratory, Madison, Wisconsin, "Creep of Structural Lumber", In: Perkins, R.W., ed. Mechanics of cellulosic and polymeric materials: Proceedings, 3d Joint ASCE/ASME Mechanics conference; Jul. 9-12, 1989; San Diego. New York: The American Society of Mechanical Engineers, pp. 215-221.
Jerrold E. Winandy et al., USDA Forest Products Laboratory, Madison, Wisconsin, "Thermal Degradation of Wood Fibers During Hot-Pressing of MDF Comosites: Part I. Relative Effects and Benefits of thermal Exposure", Wood and Fiber Science, 39(3), 2007, pp. 450-461.
Ján Iždinský et al., Department of Wood Technology, Faculty of Wood Sciences and Technology, Technical University in Zvolen, T.G. Masaryka 24, 960 01 Zvolen, Slovakia, "Particleboards from Recycled Wood", Forests 2020, 11, 1166; doi:10.3390/f11111166, www.mdpi.com/journal/forests, pp. 1-16.
Michael P. C. Conrad et al., University of British Columbia, Vancouver, BC Canada, "Fracture of Solid Wood: A review of Structure and Properties at Different Length Scales", Wood and Fiber Science, 35(4), Oct. 2003, pp. 570-584.
Fred M. Lamb, Professor, Virginia Tech, Blacksburg, Viriginia, "Splits and Cracks in Wood", pp. 16-24.
Russian Search Report with English Translation for Application No. 2021106874/10 dated Dec. 10, 2021, 5 pages.
Russian Office Action with English Translation for Application No. 2021106874/10 dated Dec. 10, 2021, 9 pages.
Ukrainian Office Action with English Translation for Application No. 2019 11262 dated Dec. 3, 2021, Ukrainian Institute for Intellectual Property, 13 pages.
Chinese Office Action with English Translation for Chinese Patent Application No. 201780092916.6 dated Jan. 6, 2022, 26 pages.
European Office Action for European Patent Application No. 17742256.5 dated Feb. 21, 2022, 5 pages.
Chinese Office Action for Chinese Patent Application No. 201780092916.6 dated May 13, 2022, 19 pages.
Chinese Office Action with English Translation for Chinese Patent Application No. 201780092916.6 dated Dec. 22, 2022, 7 pages.

* cited by examiner

ORIENTED STRAND BOARD, PROCESS FOR PRODUCTION OF AN ORIENTED STRAND BOARD AND APPARATUS FOR PRODUCING AN ORIENTED STRAND BOARD

CROSS-REFERENCE TO RELATED APPLICATIONS

This application is a 371 nationalization of international patent application PCT/EP2017/068428 filed Jul. 20, 2017, which claims priority under 35 USC § 119 to German patent application 20 2017 103 956.0 filed Jul. 3, 2017. The entire contents of each of the above-identified applications are hereby incorporated by reference.

DETAILED DESCRIPTION

The present invention relates to a novel oriented strand board (OSB) comprising recycled wood flakes that have been obtained by flaking of recycled wood at least in a core layer. The present invention likewise relates to a process for producing a corresponding oriented strand board and to an apparatus by which the oriented strand board of the invention can be produced or with which the process of the invention can be executed.

Oriented strand boards have to date always been produced from virgin wood. For this purpose, tree trunks are used, which, after excortication, are flaked to "strands". This is done using what are called OSB flakers. The strands produced are classified by size, generally into two fractions, with use of the fraction having the largest strands for production of surface layers of the oriented strand board, while the fraction having the smaller flakes is usually used in the inner core layer of the oriented strand board or is discharged from the OSB process. Prior to the classification, the strands produced are generally dried. The dried individual fractions of strands are subsequently glued and are each laid one on top of another to give oriented flake mats. After pressing and the simultaneous hardening of the binder, the oriented strand board is complete.

The prior art discloses a multitude of different processes for producing woodbase material boards, for example oriented strand boards.

For instance, AU 2010-209995 A1 describes a composite board comprising wood strips and a binder, wherein the wood may optionally include virgin wood, recycled wood, OSB wafer board, strand board, smartply, sterling board, wood structured panel, hard board, fiber board, particle board, laminated veneer lumber (LVL) or any other suitable engineered wood.

DE 4 224 629 A1 describes a process for recycling woodbase materials composed of woodbase materials glued with urea-formaldehyde binders, with or without a plastic coating, by crushing the elements into small fragments in a pretreatment step and separating out any metal parts such as fixtures or the like, in which the fragments are then exposed, in a deaggregation step, to a preferably saturated steam atmosphere under high pressure and at high temperature over a particular deaggregation period. In this time, the fragments breakdown into fibrous base constituents which can be glued to give new elements.

DE 10 130 526 A1 relates to a process for producing woodbase material boards, in which fines fractions, for example sawdusts or flakes cut to a short length, are applied to the surface layers of the oriented strand board. For this purpose, it is possible to increase the sliding and adhesion properties of the oriented strand boards.

DE 19 751 326 A1 relates to a woodbase material board comprising amino resin-containing used, residual and waste woodbase materials, and to processes for production thereof and to processes for utilization of used residual and waste woodbase materials. These waste woodbase materials are shredded and used for the production of particleboards.

DE 10 2008 059 527 A1 discloses a medium-density fiberboard (MDF) into which effect particles are incorporated to form an esthetically pleasing configuration.

EP 2 216 149 A1 discloses a process for producing particleboards which can make use of flakes of recycled wood among other materials.

In the case of oriented strand boards, the possibility of using recycled wood materials as raw material, which is already known for particleboard technology, has been rejected in view of the expected mechanical instability of a correspondingly produced oriented strand board.

It was therefore an object of the present invention to produce oriented strand boards that can make use of alternative raw material sources from exclusively virgin wood, where the corresponding oriented strand boards are in no way inferior in terms of the mechanical demands according to DIN EN 300:2006.

The present invention thus relates, in a first aspect, to an oriented strand board comprising at least the following three layers:
  a) an upper surface layer comprising or consisting of oriented strands bonded to one another,
  b) at least one core layer comprising flakes which have been obtained by flaking of recycled wood (recycled wood flakes) and are bonded to one another,
  c) a lower surface layer comprising or consisting of oriented strands bonded to one another,
  where the at least one core layer is arranged between the two surface layers.

The respective flakes, strands and the layers with respect to one another are bonded together here by means of a binder to give the oriented strand board.

Surprisingly, the prejudice that was widespread in the prior art that the mechanical properties of oriented strand boards leave something to be desired if raw materials other than virgin wood are processed was not confirmed. The oriented strand boards of the present invention are in no way inferior to the oriented strand boards which have been produced to an extent of 100% from virgin wood and fulfill all the mechanical properties set out for OSBs by DIN EN 300:2006: the oriented strand boards of the invention, given a specific configuration, can meet all the requirements as described, for example, for the OSB/1, OSB/2, OSB/3 or even OSB/4 types in DIN EN 300:2006.

A particular advantage of the oriented strand boards of the invention is additionally that they can be produced in a resource-conserving manner, such that less virgin word is required for production of the oriented strand boards of the invention. Moreover, it is possible to open up a further source of raw materials, namely recycled wood (or used wood), which has to date seemed suitable merely for production of particleboards or has been utilized thermally.

A characterizing feature of the oriented strand board of the invention here is that at least the core layer (if the oriented strand board has only one core layer) or the core layers (if the oriented strand board has multiple core layers) include(s) recycled wood flakes which have been obtained by flaking recycled wood, or that at least the one or more core layer(s) has/have been formed entirely from recycled wood flakes.

The expression "recycled wood" is used here in the sense of "Altholz" in the Federal Republic of Germany's legislation relating to requirements for utilization and elimination of recycled wood ("Verordnung fiber Anforderungen an die Verwertung and Beseitigung von Altholz", Altholzverordnung, published in the BGBI. [German Federal Law Gazette] I, No. 59, pages 3302-3317).

The present invention is implementable with all recycled woods, particular preference being given to using recycled wood of the A I category and/or the A II category for the purposes of the present invention.

The configuration of the recycled woods used is not relevant here; recycled wood flakes can thus be produced from recycled wood using any desired articles made of wood, for example used furniture, window frames, cladding, woodbase material boards, pallets, etc.

By contrast, the term "virgin wood" is understood to mean wood which has not been recycled but obtained directly from timber. A specific form of virgin wood is "virgin fiber wood", i.e. virgin round timber which especially includes freshly felled and delimbed but not necessarily excorticated tree trunks.

According to the present invention, it is preferable when the at least one core layer comprises or has been formed from a mixture of mutually bonded recycled wood flakes and strands.

It is likewise possible that the two surface layers likewise comprise or have been formed from a mixture of mutually bonded recycled wood flakes and strands; in the case of this embodiment, however, it is further advantageous when the proportion of recycled wood flakes in the surface layers is less than the proportion of recycled wood flakes in the core layer.

In a further preferred embodiment, it is preferable when the strands present in the at least one core layer have a smaller mean length (number-average) than the strands present in the upper and lower surface layers.

The length of a particle, for example of a flake, is understood in the context of the present invention to mean the greatest extent of the particle, for example of a flake. The mean length is understood to mean the numerically weighted mean. It can be determined, for example, by optical analysis.

The width of a particle, for example of a flake, is understood in the context of the present invention to mean the second greatest extent of the particle, for example of a flake. The mean width is understood to mean the numerically weighted mean. It can be determined, for example, by optical analysis.

The thickness of a particle, for example of a flake, is understood in the context of the present invention to mean the smallest extent of the particle, for example of a flake. The mean thickness is understood to mean the numerically weighted mean. It can be determined, for example, by optical analysis.

The oriented strand board according to the present invention may have exactly one core layer or, alternatively, especially three core layers, namely an inner core layer enclosed by two outer core layers. In each of the aforementioned preferred cases, the oriented strand board is thus of symmetric structure and hence has well-balanced mechanical properties.

As well as the recycled wood flakes, it is likewise possible for wood flakes of virgin wood to be included, which in this case replace a portion of the recycled wood flakes. Virgin wood is understood here to mean wood which has not been recycled but obtained directly from timber. If not only recycled wood flakes but also virgin wood flakes are included, preferred weight figures for recycled wood flakes that are described in detail hereinafter apply to the entire proportion by weight of recycled wood flakes and virgin wood flakes.

The geometry of any virgin wood flakes present is preferably identical to that of the recycled wood flakes; more particularly, the (mean) dimensions listed further down for recycled wood flakes are likewise applicable to virgin wood flakes. This may be due to the fact that the virgin wood flakes are preferably produced in an analogous manner to the recycled wood flakes, especially by flaking of virgin wood chips in a knife-ring flaker.

If a certain proportion of virgin wood flakes that partly replaces the recycled wood flakes is present, it is preferable to replace a proportion of 0.1% to 80% by weight, preferably 1% to 70% by weight, more preferably 5% to 50% by weight, of the recycled wood flakes with virgin wood flakes. This applies to all the embodiments of the oriented strand board that are described hereinafter.

In a further-preferred embodiment, the proportion by weight of the recycled wood flakes and any virgin wood flakes in the at least one core layer, especially in the exactly one core layer, based on all the flakes in the at least one core layer, is at least 5% by weight, preferably at least 50% by weight, more preferably at least 60% by weight, more preferably at least 70% by weight, especially preferably at least 80% by weight.

It should additionally be mentioned here that the core layer may likewise be formed to an extent of 100% from recycled wood flakes or from a mixture of recycled wood flakes and virgin wood flakes.

If the core layer is formed from a flake mixture comprising recycled wood flakes and any virgin wood flakes, it is advantageous when, as well as the recycled wood flakes and any virgin wood flakes, strands are still a constituent of the core layer. The proportion by weight of the strands in the core layer here is preferably complementary to the proportion by weight of the recycled wood flakes and of any virgin wood flakes; in other words, the proportion by weight of the strands in the core layer, especially in the exactly one core layer, based on all the wooden particles (i.e. the sum of all flakes and strands) in the at least one core layer, is preferably not more than 95% by weight, preferably not more than 50% by weight, more preferably not more than 40% by weight, more preferably not more than 30% by weight, especially preferably not more than 20% by weight.

In an alternative and likewise preferred embodiment, the oriented strand board may have three core layers, and hence (including the upper and lower surface layers) a total of five layers. The three core layers here constitute an inner core layer enclosed by two outer core layers. In this embodiment, it is preferable that the proportion by weight of the recycled wood flakes and of any virgin wood flakes in the inner core layer is higher than in the outer core layers, and the proportion by weight of the strands having a smaller mean length (number-average) compared to the strands in the upper and lower surface layers is less in the inner core layer than in the outer core layers.

In the aforementioned embodiment in which the oriented strand board has three core layers, it is advantageous when the proportion by weight of the recycled wood flakes and of any virgin wood flakes in the inner core layer, based on all the wooden particles (i.e. the sum of all flakes and strands) in the inner core layer, is at least 5% by weight, preferably 5 to 100% by weight, more preferably at least 50% by weight to 90% by weight, especially preferably 60 to 85% by weight, and/or the proportion by weight of the recycled wood flakes in the outer core layers, based on all the flakes in the outer core layers, is at least 5% by weight, preferably 5 to 100% by weight, more preferably 20% by weight to 80% by weight, especially preferably 30 to 70% by weight, where the proportions by weight of the recycled wood flakes in the inner core layer and in the outer core layers are different, the proportion by weight of the recycled wood flakes in the inner core layer preferably being greater than in the outer core layers.

In the configuration of the inner and outer core layers, it is likewise possible that, for example, the inner core layer is formed exclusively from recycled wood flakes and of any virgin wood flakes, and the outer core layers are formed from a mixture of strands and recycled wood flakes and of any virgin wood flakes.

In this case, it is especially preferable when the strands in the outer core layers are oriented transverse to the orientation of the strands present in the surface layers.

This likewise includes the possibility that both the inner core layer and the outer core layers are formed to an extent of 100% from recycled wood flakes and any virgin wood flakes, in this case preferably using recycled wood flakes having smaller mean dimensions (for example smaller mean number-average length) for the production of the inner core layer than for the outer core layers.

The strands used for the surface layers preferably have a mean length (number-average) of 40 to 250 mm, preferably 50 to 250, more preferably 70 to 150 mm, a mean width (number-average) of 2 to 40 mm, preferably 5 to 25 mm and/or a mean thickness (number-average) of 0.3 to 1.5 mm, preferably 0.5 to 1.2 mm.

In a preferred embodiment, the recycled wood flakes and any virgin wood flakes have a mean length (number-average) von 5 to 50 mm, preferably 10 to 30 mm, a mean width (number-average) of 0.2 to 10 mm, preferably 0.5 to 5 mm and/or a mean thickness (number-average) of 0.3 to 2 mm, preferably 0.3 to 1.2 mm.

If the core layer likewise includes strands, these preferably have a mean length (number-average) of 10 to 150 mm, preferably 30 to 100 mm, a mean width (number-average) of 0.5 to 30 mm, preferably 2 to 15 mm and/or a mean thickness (number-average) of 0.3 to 1.5 mm, preferably 0.5 to 1.2 mm, where the mean length (number-average) is less than that of the strands present in the upper and/or lower surface layer.

The recycled wood flakes present in the oriented strand board of the invention are preferably obtained by flaking of chips of recycled wood, especially by means of a knife-ring flaker. Any virgin wood flakes present can be obtained by corresponding flaking of chips of virgin wood.

Preferably, the strands present in the two surface layers are arranged in an oriented manner. The orientation of the strands imparts high mechanical strength to the oriented strand board, especially in the one preferred longitudinal direction. Preferably, the strands here are oriented with respect to a longitudinal axis of the oriented strand board such that at least 60%, preferably at least 70%, especially preferably at least 80%, of the strands deviate in their longitudinal alignment by not more than 20° from a longitudinal direction of the oriented strand board.

The orientation of the strands can be determined in a routine manner, for example, by sample analysis of the finished oriented strand boards, in the scattering during the production process as described below, or by optical test methods.

It is especially preferable here that the oriented strands in the upper surface layer and the lower surface layer have the same orientation, i.e. are oriented in the same manner.

The total thickness of the oriented strand board may be 4 to 100 mm, preferably 6 to 40 mm.

It is likewise preferable here that the total thickness of the upper and lower surface layers makes up 20% to 60%, preferably 25% to 50%, more preferably 30% to 40%, of the total thickness of the oriented strand board and/or the thickness of the at least one core layer makes up 80% to 40%, preferably 75% to 50%, more preferably 70% to 60%, of the total thickness of the oriented strand board.

The oriented strand board according to the present invention especially has an apparent density of 450 to 750 kg/m$^3$, preferably 520 to 670 kg/m$^3$.

In a further preferred embodiment, the binder used for binding of the respective flakes is selected from the group consisting of binders based on polymeric diphenylmethane diisocyanate (PMDI), melamine-formaldehyde-urea-based binders (MUF), melamine-urea-phenol-formaldehyde binders (MUPF), phenol-formaldehyde-based binders, natural binders, e.g. starch-based binders, protein-based binders, binders based on tannin, lignin or carbohydrates that have been degraded down to monomers, thermoplastic or crosslinked thermoplastic adhesives, and mixtures and combinations thereof.

The strands present in the surface layers and any strands present in the at least one core layer can especially be obtained by flaking virgin wood.

In a second aspect, the present invention relates to a process for producing an oriented strand board as described in detail above, in which a scattered particle mat composed of several mats is first scattered and is then pressed to give the oriented strand board. For production of the scattered particle mat, the following steps are conducted here:

a) An surface layer mat comprising or consisting of strands provided with binder is produced by oriented scattering of strands that have been provided with binder or of a flake mixture comprising strands that has been provided with binder.

b) At least one core layer mat comprising recycled wood flakes which have been obtained by flaking of recycled wood and have been provided with binder is scattered onto the surface layer mat produced in step a).

c) A further surface layer mat comprising or consisting of strands that have been provided with binder is produced or laid onto the at least one core layer mat produced in step b), by oriented scattering of strands that have been provided with binder or of a flake mixture comprising strands that has been provided with binder.

Subsequently, the scattered particle mat, for hardening and solidification of the binder, is pressed at elevated temperature relative to standard conditions to give the oriented strand board.

It is thus an essential feature of the process of the invention that the mats that represent the respective layers (i.e. the surface layers or the at least one core layer of the oriented strand board to be produced) are scattered separately and successively one on top of another and, finally, the scattered particle mat consisting of the individual mats is pressed to give the finished oriented strand board. In this case, recycled wood flakes are used at least for production of the core layer mat.

The recycled wood flakes can especially be obtained in a preceding step by flaking of chips of recycled wood, especially by means of a knife-ring flaker. Any virgin wood flakes used can be obtained analogously by flaking of chips of virgin wood.

If the recycled wood flakes are produced by flaking of chips of recycled wood, it is likewise preferable that the chips of recycled wood are produced by shredding of recycled wood, especially by means of a chopper, for example a drum chopper, a hammer mill or an impact flaker, or are sourced externally.

Alternatively, it is also possible here that the chips of recycled wood can be sourced from external sources.

If shredding of the recycled wood to give chips takes place, and the sources of recycled wood are too large for the corresponding shredding apparatuses (for example in the case of large items of furniture etc.), one option is to undertake, prior to the shredding to give chips, rough pre-shredding of the recycled wood material in piece form, for example by means of a crusher, in which the large pieces of recycled wood are crushed to smaller pieces.

In order to enable maximum efficiency of flaking, it is likewise advantageous when the chips (either separately produced or sourced from external sources), prior to the flaking, are classified by means of a sorter for example, i.e. sorted by size, especially by means of a disk sorter and/or roller sorter, and a chip fraction having a mean greatest dimension (number-average) of 20 to 150 mm, preferably 30 to 120 mm, is sent to the flaking.

It may be the case that further larger and/or smaller chip fractions are obtained.

Preferably, chip fractions having a mean greatest dimension (number-average) of more than 150 mm, preferably more than 120 mm, are sent back to the shredding operation for production of chips.

Alternatively or additionally, it is likewise possible that chip fractions having a mean greatest dimension (number-average) of less than 20 mm, preferably of less than 30 mm, that are obtained in the classifying operation are thermally utilized or used for particleboard production.

Since recycled wood is a relatively inhomogeneous material, one option is to conduct at least one purifying step prior to the use for the purposes of the present invention. It is particularly the case that, prior to the flaking and/or prior to the shredding and/or prior to the rough preshredding, at least one of and preferably all the following steps are conducted in any sequence:
  removal of substances having a lower density than wood (e.g. plastic films, paper, paperboard, cardboard), for example by pneumatic sorting,
  removal of ferromagnetic metals, for example by means of magnetic sorters,
  removal of non-ferromagnetic metals, especially of aluminum, for example by means of eddy current sorters,
  removal of substances having a higher density than wood (stones, glass, sand, minerals) by gravimetric sorting, for example windsifting sorters, gravitational sorters or flotation sorters, and/or
  removal of non-woody substances, for example by x-ray sorters and/or by video sorters.

Preferably, one or more of the aforementioned purification steps are conducted repeatedly in the process of the invention.

For example, it may be the case that removal of metals (ferromagnetic or nonferromagnetic metals) is undertaken repeatedly. Repeated removal of nonmetallic materials is also possible.

Particularly immediately prior to the flaking of the chips, a new and separate removal of metallic and/or ceramic materials is advantageous, in order to avoid damage to the flaking apparatus.

It is likewise possible to classify the recycled wood flakes (which have been produced, for example, by flaking from recycled wood chips or sourced externally) and any virgin wood flakes by size prior to the production of the scattered particle mat. More particularly, recycled wood flakes having a mean length (number-average) of 5 to 50 mm, preferably 10 to 30 mm, a mean width (number-average) of 0.2 to 10 mm, preferably 0.5 to 5 mm, and/or a mean thickness (number-average) of 0.3 to 2 mm, preferably 0.3 to 1.2 mm, are to be used for the purposes of the process of the invention.

Fines fractions that are produced in the classification step and separated from the recycled wood flakes and any virgin wood flakes (i.e. recycled wood flakes having a mean length (number-average) below 5 mm) can, for example, be utilized thermally or be used for particleboard production. It is likewise possible to classify the fines fraction once again and to separate a flake fraction within the above-specified dimensioning therefrom. This fraction can likewise be used for the purposes of the present invention.

Any coarse fraction removed (i.e. recycled wood flakes and any virgin wood flakes having a mean length (number-average) above 50 mm) can be sent back to the flaking and shredded further in order thus to obtain a flake fraction usable for the purposes of the present invention.

A middle fraction wherein the recycled wood flakes have, for example, the mean dimensions described above is especially used for the production of the oriented strand board of the invention.

For the purposes of the present invention, it is possible that the surface layer mats are produced entirely from strands provided with binder which have been obtained, for example, by flaking of virgin wood, while the one or more core layer mats may be formed entirely from recycled wood flakes and optionally virgin wood flakes.

However, it is especially preferable, for the purposes of the production of the individual mats, first to mix the strands produced and the recycled wood flakes and any virgin wood flakes with one another, and subsequently to classify the mixture obtained by size and to use the individual fractions for production of the individual mats.

This particularly preferred variant is described in detail hereinafter.

If, as described above, a mixture of strands and recycled wood flakes and any virgin wood flakes is produced, this can be effected, for example, by active mixing of the individual types of flake, but the mixture is preferably produced automatically by conveying or processing the flake mixture in the subsequent operating steps, for example by common storage of the different flake types in a reservoir bunker or by common conveying in a conveying apparatus.

More particularly, for example, the mixture of recycled wood flakes and of any virgin wood flakes and strands can be dried, especially in a drum dryer.

In the case of common drying of the strands and the recycled wood flakes and of any virgin wood flakes, only a single apparatus is thus needed for drying of the flake mixture, such that the apparatus complexity can be minimized.

If separate layers can be produced from a single type of strands or recycled wood flakes, it is of course likewise possible that these are dried separately, for example in separate drum dryers.

In the case of the aforementioned mixture of recycled wood flakes, it is preferable here to choose mixing ratios of the recycled wood flakes to strands of 5:95 to 95:5, preferably of 20:80 to 90:10, more preferably of 40:60 to 75:25, especially preferably of 45:55 to 60:40.

The flake mixture produced beforehand is thus preferably classified by mean size of the recycled wood flakes and strands. The fractions produced, according to their size, are used for the surface layer mat or the core layer mat(s), with the use of the coarser fraction of the flake mixture for the surface layer mats and of the fraction of the flake mixture with smaller dimensions for the core layer mat(s).

The classification can be effected here, for example, by means of disk sorters, screen sorters, roller sorters, vibrational sorters or a combination of two or more identical or different measures from those mentioned above.

Classification is effected here into two or three fractions, namely an surface layer fraction, a core layer fraction and optionally a fines fraction.

The surface layer fraction is used for production of the surface layer mat and has the greatest mean flake dimension (greatest mean length (number-average)). In general, the classification is effected such that the surface layer fraction is formed predominantly from strands.

In addition, a core layer fraction is formed, which is used for production of the core layer mat(s). If the oriented strand board to be produced has exactly one core layer, the core layer fraction is used entirely for production of the core layer mat. If the oriented strand board has a plurality of core layers, for example three core layers (two outer core layers and one inner core layer), the core layer fraction is used for production of outer core layer mats, which later result in the outer core layer. It is a feature of the core layer fraction that strands having a smaller mean length (number-average) than the strands present in the surface layer fraction are present.

If the oriented strand board likewise also has an inner core layer, it is produced using an inner core layer mat embedded between the two outer core layer mats. For this purpose, a fines fraction is used, consisting primarily of recycled wood flakes and optionally virgin wood flakes, the flakes of which overall have the smallest mean dimensions (mean length (number-average)).

No classification corresponding to the details above is necessary if a single type of strands is used for production of the surface layer mat and a single type of recycled wood flakes is used for production of the core layer mat or a separately produced mixture of recycled wood flakes and strands is used for production of the core layer mat.

In step b) described at the outset, it is thus preferable that exactly one core layer mat, or three core layer mats arranged one on top of another, namely an inner core layer mat enclosed by one outer core layer mat on each side, is produced.

It is further preferable when, in the at least one core layer mat, the proportion by weight of the recycled wood flakes and of any virgin wood flakes, especially in the exactly one core layer mat, based on all the flakes in the at least one core layer mat, is at least 5% by weight, preferably at least 50% by weight, more preferably at least 60% by weight, more preferably at least 70% by weight, especially preferably at least 80% by weight, and the proportion by weight of the strands of smaller mean length (number-average) compared to the strands in the upper and lower surface layer mat is not more than 95% by weight, preferably not more than 50% by weight, more preferably not more than 40% by weight, more preferably not more than 30% by weight, especially preferably not more than 20% by weight.

If three core layer mats are produced, namely an inner core layer mat enclosed by one outer core layer mat on each side, it is advantageous when (i) the proportion by weight of the recycled wood flakes and of any virgin wood flakes in the inner core layer mat is set to be higher than in the outer core layer mats and (ii) the proportion by weight of the strands having a smaller mean length (number-average) compared to the strands in the two surface layer mats in the inner core layer mat is set to a lower level than in the outer core layer mats.

If strands are present in the outer core layer mats, these are preferably scattered transverse to the orientation of the strands in the surface layer mats.

The aforementioned option also includes the formation of the inner core layer mat entirely from recycled wood flakes and any virgin wood flakes. It is likewise possible that no strands are present in the outer core layer mats. If three core layer mats are used and none of the core layer mats includes strands, it is preferable here that recycled wood flakes and optionally virgin wood flakes having greater mean dimensioning (i.e. greater mean length (number-average)) are used for the outer core layer mats.

In a preferred embodiment, it is the case here that the proportion by weight of the recycled wood flakes and of any virgin wood flakes in the inner core layer mat, based on all the flakes in the inner core layer mat, is set to at least 5% by weight, preferably 5% to 100% by weight, more preferably at least 50% by weight to 90% by weight, especially preferably 60% to 85% by weight.

Alternatively or additionally thereto, it is likewise possible that the proportion by weight of the recycled wood flakes and of any virgin wood flakes in the outer core layer mats, based on all the flakes in the outer core layer mats, is set to at least 5% by weight, preferably 5% to 100% by weight, more preferably 20% by weight to 80% by weight, especially preferably 30% to 70% by weight, where the proportion by weight of the recycled wood flakes and of any virgin wood flakes in the inner core layer mat and the outer core layer mats are different in each case, the proportion by weight of the recycled wood flakes in the inner core layer mat preferably being greater than in the outer core layer mats.

For production of the surface layer mat, in particular, strands having a mean length (number-average) of 40 to 250 mm, preferably 50 to 250 mm, more preferably 70 to 150 mm, a mean width (number-average) of 2 to 40 mm, preferably 5 to 25 mm and/or a mean thickness (number-average) of 0.3 to 1.5 mm, preferably 0.5 to 1.2 mm, are used. It is immaterial here whether the strands are used in the form of a single type or, if appropriate, are obtained by classification of a mixture of strands and recycled wood flakes.

It is further preferable that the strands present in the at least one core layer mat have a mean length (number-average) of 10 to 150 mm, preferably 30 to 100 mm, a mean width (number-average) of 0.5 to 30 mm, preferably 2 to 15 mm and/or a mean thickness (number-average) of 0.3 to 1.5 mm, preferably 0.5 to 1.2 mm, where the mean length (number-average) is less than that of the strands present in the surface layer mats.

It is immaterial here whether the strands used for the at least one core layer mat are used in the form of a single type or have been obtained by classification of a mixture of strands and recycled wood flakes.

In a preferred embodiment, in step a) and step c), the strands are oriented with respect to a longitudinal axis of the oriented strand board such that at least 60%, preferably at least 70%, especially preferably at least 80%, of the strands deviate in their longitudinal alignment by not more than 20° from a longitudinal direction of the oriented strand board.

It is especially preferable that the strands in step a) and step c) have the same orientation.

The total thickness of the oriented strand board is especially set to 4 to 100 mm, preferably 6 to 40 mm. For this purpose, the dimensions of the scattered particle mat and the compaction factor in the pressing operation are appropriately matched to one another.

Preferably, the binder is selected from the group consisting of binders based on polymeric diphenylmethane diisocyanate (PMDI), melamine-formaldehyde-urea-based binders (MUF), melamine-urea-phenol-formaldehyde binders (MUPF), phenol-formaldehyde-based binders, natural binders, e.g. starch-based binders, protein-based binders, binders based on tannin, lignin or carbohydrates that have been degraded down to monomers, thermoplastic or crosslinked thermoplastic adhesives, and mixtures and combinations thereof.

In a third aspect, the present invention relates to an apparatus for production of an oriented strand board as described above, with which the process of the invention described above can also be performed.

The apparatus of the invention comprises
- at least one scattering apparatus for production of a first surface layer mat, comprising or consisting of oriented strands that have been provided with binder,
- at least one scattering apparatus for production of at least one core layer mat on the first surface layer mat, especially one scattering apparatus or two scattering apparatuses for production of exactly one core layer mat or at least 3 scattering apparatuses for production of three core layer mats, namely an inner core layer mat enclosed by one outer core layer mat on each side, where the at least one scattering apparatus is preceded upstream by a binder apparatus,
- at least one scattering apparatus for production of a second surface layer mat comprising or consisting of oriented strands that have been provided with binder on the at least one core layer mat,
- where the at least one scattering apparatus for production of a first and second surface layer mat is preceded upstream by a common binder apparatus or by one separate binder apparatus for each, and
- a press, arranged downstream of the scattering apparatuses, for pressing of the scattered particle mat at elevated temperature relative to standard conditions.

The apparatus of the invention can be configured in two alternative variants which can also be combined with one another.

The respective binder apparatuses serve here for application of at least one binder to the flakes. They are thus gluing apparatuses.

In a first variant, the apparatus of the invention comprises (i) at least one classifying apparatus, connected upstream of the scattering apparatuses, for production of a coarse fraction, a middle fraction and optionally a fines fraction, wherein the coarse fraction produced is sent in each case to the at least one scattering apparatus for production of a first and second surface layer mat, and the middle fraction and optionally the fines fraction are sent to the at least one apparatus for production of at least one core layer mat, and the at least one classifying apparatus is preceded upstream by (ii) at least one mixing zone, for example a mixing bunker, for mixing of strands and recycled wood flakes.

The aforementioned first variant of the apparatus of the invention opens up the option that a mixture of strands and recycled wood flakes and any virgin wood flakes is first produced and is then classified and used for the purposes of the individual mat for production of the individual layers of the oriented strand board.

The second variant of the configuration of the apparatus of the invention especially enables the production of homogeneous layers in the oriented strand board, for example homogeneous surface layers formed exclusively from strands and core layers formed exclusively from recycled wood flakes and any virgin wood flakes.

The second variant can also be utilized in order to control the content of the individual flake types (i.e. strands and recycled wood flakes and any virgin wood flakes) in the individual mats if the mats are produced according to the first variant. This variant thus combines the measures of the first and second variants.

In the aforementioned first variant, it is especially advantageous when there is at least one drying apparatus arranged between the at least one classifying apparatus and the at least one mixing zone, for example a mixing bunker.

In the second variant of the apparatus of the invention, it may preferably be the case that the respective binder apparatuses connected upstream of the scattering devices are each preceded upstream by separate drying devices.

The apparatus of the invention preferably further comprises at least one flaking apparatus for production of strands (OSB flaker) which is especially connected upstream of the mixing bunker.

Alternatively or additionally thereto, the apparatus of the invention preferably comprises at least one flaking apparatus for production of recycled wood flakes, especially at least one knife-ring flaker for flaking of chips of recycled wood, which is especially connected upstream of the mixing bunker.

More particularly, the flaking apparatus for production of recycled wood flakes may be preceded upstream by at least one apparatus for production of chips from recycled wood.

In a further-preferred embodiment, there is at least one apparatus for classification of the recycled wood flakes arranged between the at least one flaking apparatus for production of recycled wood flakes and the mixing bunker.

In a further-preferred embodiment, there is at least one apparatus for classification of the chips of recycled wood arranged between the at least one flaking apparatus for production of recycled wood flakes and the at least one apparatus for production of chips from recycled wood.

The apparatus of the invention preferably comprises at least one of, preferably more than one of and especially preferably all the following apparatuses for
- removal of substances having a lower density than wood (e.g. plastic films, paper, paperboard, cardboard), for example by pneumatic sorting,
- removal of ferromagnetic metals, for example by means of magnetic sorters,
- removal of non-ferromagnetic metals, especially of aluminum, for example by means of eddy current sorters,
- removal of substances having a higher density than wood (stones, glass, sand, minerals) by gravimetric sorting, for example windsifting sorters, gravitational sorters or flotation sorters, and/or
- removal of non-woody substances, for example by x-ray sorters and/or by video sorters.

The present invention is elucidated in detail with reference to the figures which follow, without restriction of the invention to the specific parameters detailed.

Figure 1:
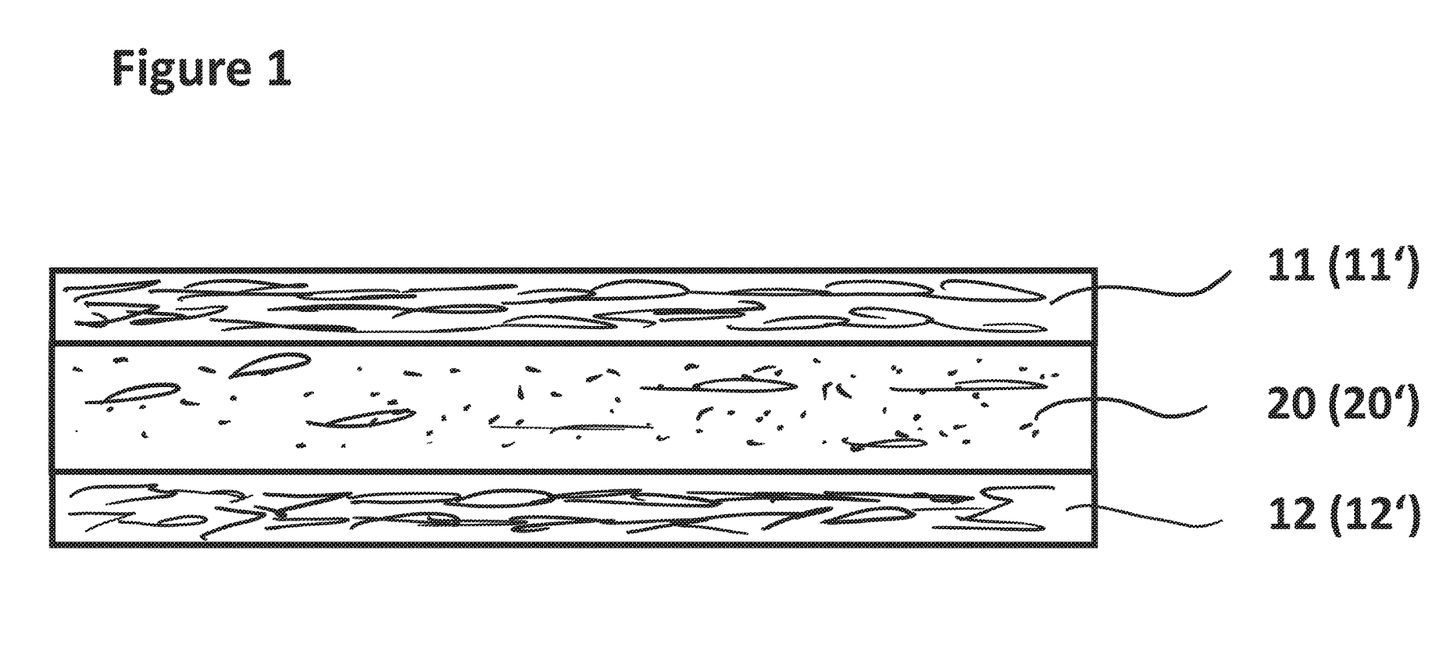
FIG. 1 a first embodiment of an oriented strand board of the invention.

FIG. 1 shows a first configuration form of an oriented strand board of the invention. This board has a three-layer structure and comprises two surface layers, namely an upper surface layer 11 and a lower surface layer 12. The surface layers 11, 12 consist here either to an extent of 100% of strands (OSB strands) or of a mixture of strands and smaller recycled wood flakes, although the proportion by weight of strands preferably predominates over the recycled wood flakes in the surface layers 11, 12. The oriented strand board according to FIG. 1 likewise comprises a core layer 20 either formed to an extent of 100% from recycled wood flakes or (as in the present case) from a mixture of strands and recycled wood flakes, with the proportion by weight of recycled wood flakes predominating over the strands in the core layer 20 of the number. All the flakes within the individual layers have been bonded to one another here by means of a suitable binder and pressed. The oriented strand board is produced by pressing a scattered particle mat composed of different mats of flakes that have been provided with binder together with one another. A corresponding scattered particle mat can likewise be inferred from FIG. 1. In this case, first of all, a lower surface layer mat 12' is deposited. Since the surface layer mat is formed either to an extent of 100% from strands or from a mixture of mainly strands and recycled wood flakes as already described above, the strands are deposited in a manner known from the prior art, such that the flakes are given a preferential direction and hence there is oriented alignment of the strands in the lower surface layer mat 12'. A core layer mat 20' consisting, for instance, to an extent of 100% of recycled wood flakes or of a mixture of recycled wood flakes and strands is deposited on the lower surface layer mat 12', where the proportion by weight of recycled wood flakes is preferably predominant over the strands in the core layer mat 20'. A further upper surface layer mat 11' is deposited on the core layer mat 20', the flakes used for the upper surface layer mat preferably being identical to the flakes which are also used for the lower surface layer mat 12'. This is likewise true of any flake mixtures used for the respective upper and lower surface layer mats 11', 12'. On production of the individual mats, the flakes or flake mixtures used have already been provided with binder. The scattered particle mat produced is finally pressed in the manner known in the prior art to give the finished oriented strand board.

Figure 2:
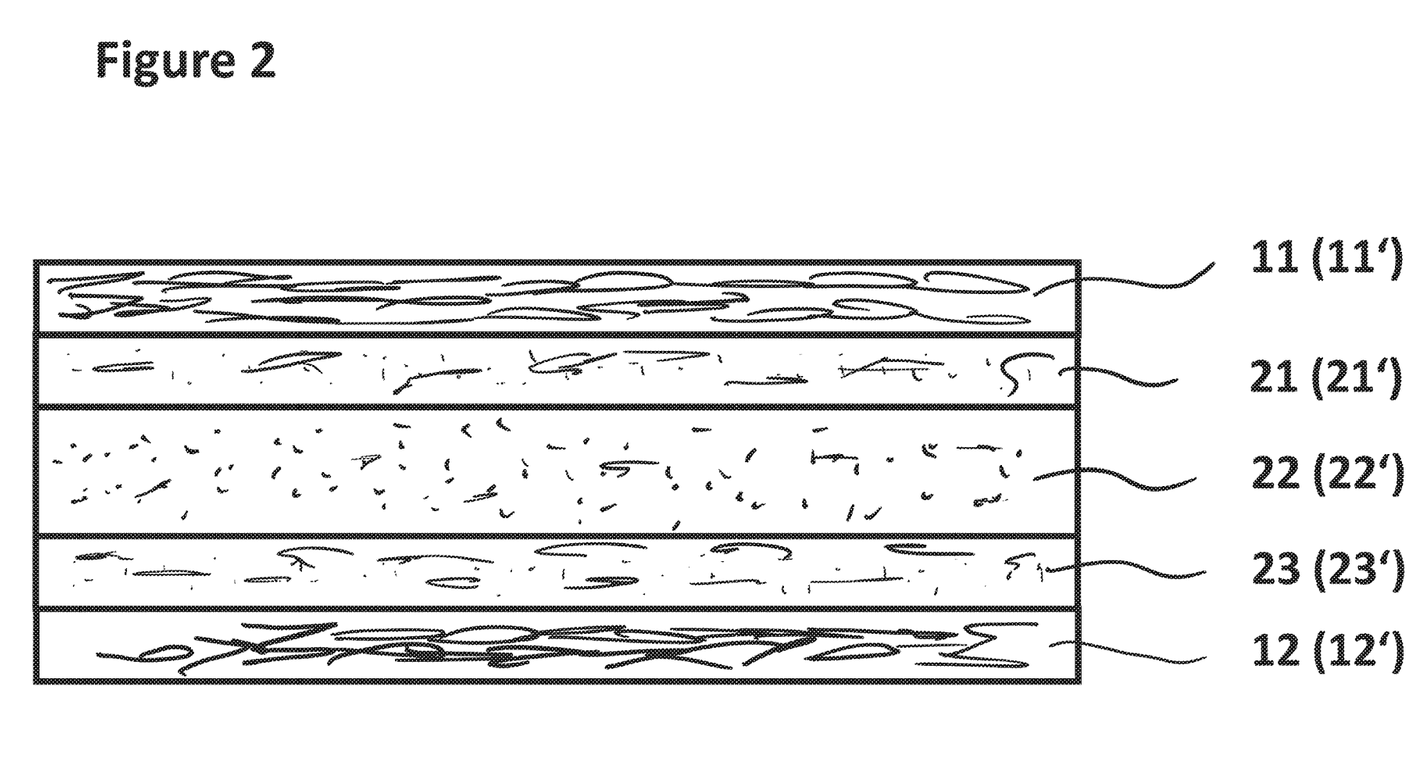
FIG. 2 a further embodiment of an oriented strand board of the invention.

FIG. 2 shows a further embodiment of an oriented strand board of the invention, which, by contrast with the oriented strand board shown in FIG. 1, is in five-layer form.

The oriented strand board here—and analogously to the oriented strand board according to FIG. 1—has upper and lower surface layers 11, 12, which are formed either to an extent of 100% from strands or from a flake mixture formed with a predominant proportion of strands and additionally also a smaller proportion of recycled wood flakes.

The oriented strand board according to FIG. 2 comprises three core layers, namely an inner core layer 22 enclosed by two outer core layers 21, 23. The inner core layer 22 is formed either to an extent of 100% by weight from recycled wood flakes or includes, as well as recycled wood flakes, a small proportion of strands. In the outer core layers 21, 23, the proportion of strands may be greater than in the inner core layer, but less than in the surface layers 11, 12.

It is likewise possible to infer from FIG. 2 the mat sequence which is used in the production of the oriented strand board shown in FIG. 2.

First of all, a lower surface layer mat 12' is produced, on which a first outer core layer mat 23' is deposited. Onto this is scattered the inner core layer mat 22', followed by a further surface layer mat 21' and finally by the upper surface layer mat 11'. The scattered particle mat produced is subsequently pressed to give the finished oriented strand board.

Figure 3:
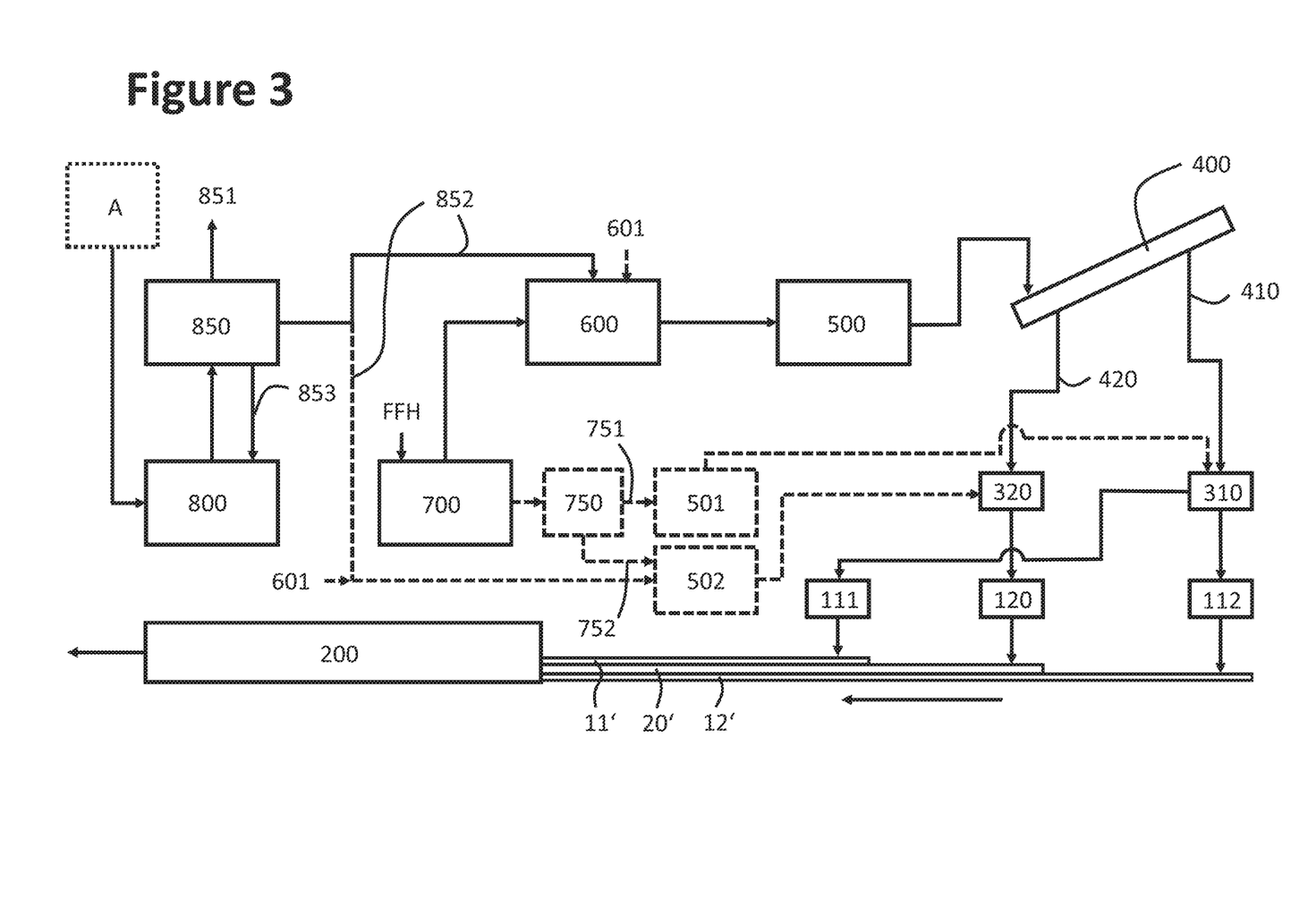
FIG. 3 a variant of an apparatus for production of an oriented strand board of the invention.

FIG. 3 shows a general configuration form of an apparatus for production of an oriented strand board according to the present invention. With the apparatus according to FIG. 3, it is possible to produce a three-layer particleboard as shown in FIG. 1.

For production of the respective mats, there are three separate scattering apparatuses for production of the respective mat. With the scattering apparatus 112, it is possible to produce the lower surface layer mat 12' comprising oriented strands. The scattering apparatus 120 serves for production of a core layer mat 20' which is deposited on the lower surface layer mat 12'. With the scattering apparatus 111, it is possible to produce an upper surface layer mat 11' on the core layer mat 20'. More particularly, continuous production of the mats is possible by application of the individual mats 11', 20', 12', for example, on a conveyor belt (which is not shown). The mats are subsequently likewise supplied to a pressing apparatus 200 in which the individual mat layers composed of flakes that have been provided with binder are pressed to give the finished oriented strand board.

If further mats are to be formed in order, for example, to achieve the oriented strand board shown in FIG. 2, additional scattering apparatuses are included in order to scatter the respective mats.

Connected upstream of the scattering apparatuses 111 and 112 here is a common binder apparatus 310 in which the strands which are used for the respective surface layer mats 11' and 12' are glued. For example, this apparatus may comprise conventional large gluing drums (drum gluers). In the scattering apparatus 120, for gluing of the flakes used for the core layer mat 20', there is likewise an upstream binder apparatus 320. Because of the fact that the core layer mat 20' consists primarily of smaller recycled wood flakes compared to the strands, preference is given to using a standard flake gluing mixer for the purposes of the binder apparatus 320.

The binder apparatuses can be supplied with flakes in two different ways that are detailed separately hereinafter.

A first option is to feed a flake mixture composed of strands (which have preferably been obtained by flaking of virgin wood, for example in an OSB flaker) and recycled wood flakes (which have been obtained, for example, by flaking of chips of used word in a knife-ring flaker), this mixture having been classified beforehand.

This option is shown in FIG. 3 in the part shown at the top. In this case, first of all, chips of recycled wood are used to produce wood flakes of used word (called recycled wood flakes) in a flaking apparatus 800, for example a knife-ring flaker. This is preferably followed by classification of the recycled wood flakes produced in a classifying apparatus 850. For this purpose, it is possible to use, for example, disk sorters or roller sorters, but also screening apparatuses. A combination of the sorting measures mentioned is likewise possible. In the illustrative case of FIG. 3, production of three recycled flake fractions is achieved with the classifying apparatus 850, namely a fines fraction 851 including, for example, dusts and very small particles. This fines fraction 851 can be utilized thermally, for example. A coarse fraction 853 produced can preferably be recycled into the flaking apparatus 800 for further raw material utilization. The midsize fraction 852 produced, which meets the desired demands on the size of the recycled wood flakes, can be used for production of the oriented strand boards of the invention.

The midsize fraction 852 of recycled wood flakes is sent to a mixing bunker 600. This mixing bunker 600 is likewise supplied with strands which have been produced, for example, in a flaking apparatus 700 for virgin fiber wood VFW, for example an OSB flaker. The mixing bunker 600 may be an active or passive mixing apparatus. In the case of an active mixing bunker, the flakes are actively moved in order to produce a flake mixture. In a passive mixing bunker, by contrast, no active mixing takes place; instead, the flakes mix of their own accord, if appropriate in the course of transport. An illustrative embodiment of a passive mixing zone here is a bunker with a moving conveyor belt into which the respective strands or recycled wood flakes are introduced stored for further processing.

It is especially likewise possible to introduce flakes that have been produced by flaking of virgin wood chips into the mixing bunker 600 (introduction option 601), such that the flake mixture in this case comprises 3 different flake types.

The flake mixture stored in the mixing bunker 600 is subsequently fed to a drying apparatus 500 in which the flake mixture is dried together. Suitable apparatuses for this purpose are especially drum dryers or belt dryers.

In some cases, it is likewise possible that the drying apparatus 500 also assumes the function of the mixing bunker 600, such that the individual flake types, i.e. strands and the middle fraction of the recycled wood flakes 852, are supplied separately to the drying apparatus 500 and are mixed therein as they dry. In this case, the mixing bunker and the drying apparatus are identical.

The dried flake mixture is subsequently sent to a classifying apparatus 400 in which the flake mixture, in the illustrative case of the apparatus according to FIG. 3, is separated into two fractions, namely an surface layer fraction 410 and a core layer fraction 420. The classifying apparatus may especially be a roller sorter or disk sorter; it is likewise also possible to use screening apparatuses or a combination of the aforementioned apparatuses.

The core layer fraction 420 produced in this case comprises a greater proportion by weight of recycled wood flakes than the surface layer fraction 410. The strands present in the core layer fraction 420 are preferably of smaller dimensions (i.e. have a smaller number-average length) than the strands present in the surface layer fraction 410.

If an oriented strand board as shown in FIG. 2 is to be produced, the dried flake mixture is divided into three fractions, in which case a fines fraction is also produced, which, after gluing, can especially be used for production of the inner core layer mat. This option is not shown in FIG. 3 for reasons of clarity.

The individual fractions, i.e. the surface layer fraction 410 and the core layer fraction 420, are sent to the respective binder apparatuses 310 and 320 and then scattered in the manner described above to give the individual surface layer mats 11' and 12' or the core layer mat 20'.

Alternatively or additionally, it is likewise possible to feed the respective recycled wood flakes produced with the flaking apparatus 800 or the strands produced with the flaking apparatus 700 to separate drying apparatuses 501 and 502. This option is shown in FIG. 3 by the dotted arrows.

For example, it is possible to feed the midsize fraction 852 produced, without mixing it with strands beforehand, to a separate drying apparatus 502. The same option is likewise possible for the strands produced with the flaking apparatus 700. These flakes too can be fed, for example, to a separate drying apparatus 501. The respective homogeneous strands or recycled wood flakes can then each be fed to the binder apparatuses 310 and 320 and scattered. It is possible that homogeneous surface layer mats 11', 12' or core layer mats 20' are thus produced. It is likewise possible to mix the homogeneous flakes with fractions 410 and 420 in order to increase or to lower the proportion of the respective flake types. These options make sense especially when the thickness of the oriented strand board to be produced is to be altered during a running process and hence the total proportion of recycled wood flakes in the oriented strand board, as the case may be, is also varied.

It is likewise possible to introduce virgin wood flakes 601 into the recycled wood flakes line.

Figure 4:
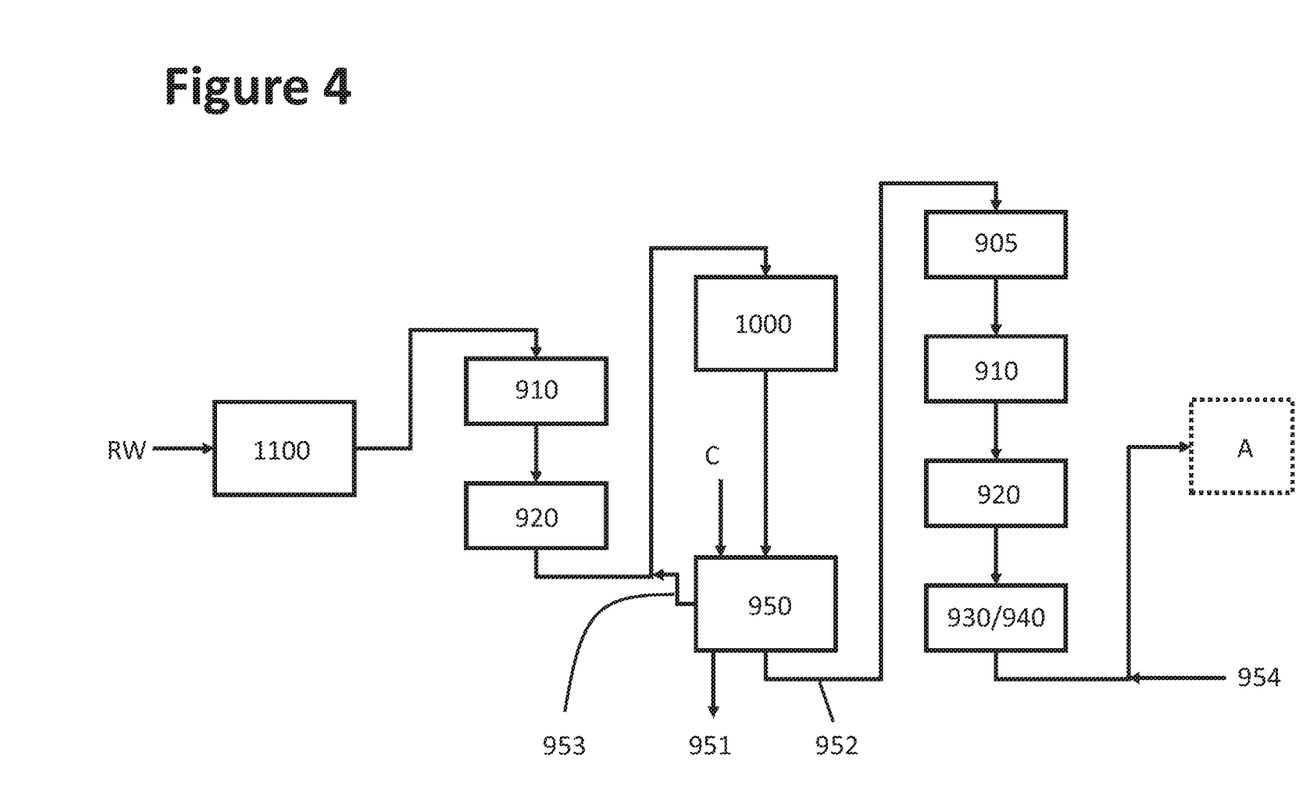
FIG. 4 a production line for processing of recycled wood connected upstream of the apparatus according to FIG. 3.

The portion of the plant shown by dotted lines with reference letter A, which serves for production of the chips of recycled wood flaked in the flaking apparatus 800, is shown separately in FIG. 4 and, in a preferred embodiment, is likewise part of the apparatus shown in FIG. 3.

FIG. 4 shows a flow diagram which shows how supplied recycled wood RW is used to produce chips of recycled wood which can be flaked in the flaking apparatus 800 shown in FIG. 3.

The supplied recycled wood, if required, is first roughly preshredded by a shredding apparatus 1100, for example a crusher. This is necessary especially when the recycled wood is supplied in the form, for example, of complete items of furniture or large beams of wood, wood boards (for example oriented strand boards). The recycled wood here is especially wood of the A I and A II categories according to the Federal Republic of Germany's Altholzverordnung legislation. In the crusher 1100, smaller fragments are produced here, which can subsequently be processed to chips.

A corresponding apparatus 1000 for production of chips is thus connected downstream of the crusher 1100. This may especially comprise choppers, for example disk choppers or drum choppers, or a hammer mill.

It is also possible for there to be, between the crusher 1100 and the chopper 1000, one or more intermediately connected apparatuses for removal of extraneous substances, for example ferromagnetic metals (especially iron), nonferromagnetic particles (especially aluminum), non-wood materials, especially stones, glass, ceramic or plastics. In the illustrative case of the apparatus according to FIG. 4, in this case, removal of ferromagnetic materials is effected here, for example by means of permanent magnets or electromagnets 910 and, if appropriate, removal of aluminum constituents, for example with an eddy current sorter 920.

The chips produced with the chopper 1000 are preferably classified in a classifying apparatus 950 into three fractions 951, 952, 953. A chip fraction having the smallest mean dimensions 951 can be sent, for example, to chipboard production or utilized thermally.

A large chip fraction 953 with the greatest mean dimensions can be sent back to the chopper 1000.

A chip fraction 952 with suitable mean greatest dimensions can be used for further processing and final flaking to give recycled wood flakes.

If chips of recycled wood are produced elsewhere they can be introduced into the classifying apparatus 950. This possibility is shown in FIG. 4 with C.

Prior to flaking in the flaking apparatus 800, the chips are preferably subjected to a plurality of purifying steps.

For this purpose, for example, substances having a smaller specific density than wood, for example polymer films or a wide variety of different paper materials or cardboard materials can be removed by means of pneumatic sorting 905. Ferromagnetic metals are likewise removed with a magnet 910 and nonferromagnetic metals, for example aluminum, with an eddy current sorter 920. In addition, density separation 930 is likewise possible, in which, for example, substances having greater specific density than wood, especially stones, ceramic and glass, are removed. Remaining impurities which especially originate from plastic materials can be removed, for example, by x-ray sorting and/or by video sorting 940. The various purification stages can also be run through more than once or executed more than once. The chips produced, as also shown in FIG. 4 by reference numeral A, are fed to the flaker 800 in FIG. 3. In addition, it is possible, in the case of an introduction option 954, additionally to introduce chips of virgin wood together with the chips of recycled wood and to flake these together in the flaker 800.

Figure 5:
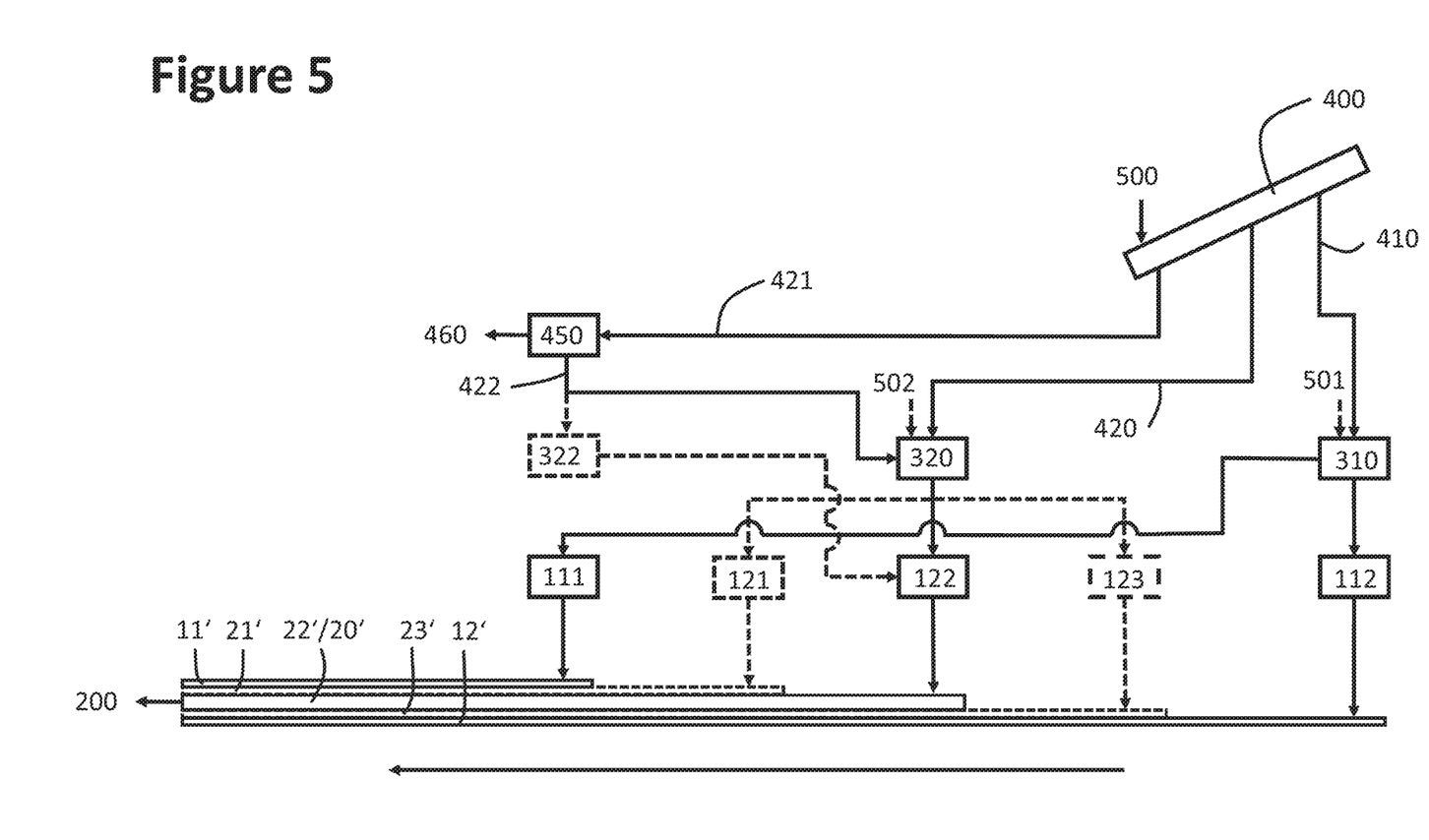
FIG. 5 a further variant of an apparatus for production of an oriented strand board of the invention.

FIG. 5 shows a further embodiment of an apparatus according to the present invention for production of an oriented strand board of the invention. The apparatus is of identical configuration to the apparatus shown in FIG. 3 apart from the classifying apparatus 400 for the flake mixture. The upstream components are not shown again merely for the sake of clarity. However, the interfaces with the components that are not shown explicitly (drying apparatuses 500, 501, 502) are indicated. The apparatus according to FIG. 5, by contrast with the apparatus according to FIG. 3, has a total of 5 scattering apparatuses 111, 121, 122, 123, 112 and thus enables the production of a five-layer oriented strand board, for example as described in FIG. 2. A particular advantage of the apparatus according to FIG. 5 that should be mentioned is that it can be operated in a flexible manner and also enables the production of a three-layer oriented strand board, as shown, for example, in FIG. 3. The apparatus shown in FIG. 5 comprises a classifying apparatus 400 for the dried flake mixture obtained from the drying apparatus 500. By contrast with the apparatus according to FIG. 3, this classifying apparatus 400 enables the separation of the flake mixture into three fractions, namely an surface layer fraction 410, a middle fraction 420 and a fines fraction 421. These fractions 410, 420, and 421 differ in decreasing mean flake dimensions (number-average), especially in decreasing mean flake lengths (number-average). The surface layer fraction 410 contains mainly strands and is used for production of the surface layer mats 11', 12'. The middle fraction 420, according to the settings, contains a certain proportion of strands and of recycled wood flakes (and optionally a certain proportion of virgin wood flakes which can be applied in the case of the feeding means 601 provided for the purpose) and is used for production of the outer core layer mat 21', 23'. The fines fraction 421 is very substantially free of strands and consists mainly of recycled wood flakes (and any virgin wood flakes). The core layer fraction 420 can alternatively also be adjusted so as to be very substantially free of strands. In this case, the core layer fraction 420 consists very substantially of recycled wood flakes (and any virgin wood flakes). In this case, the mean flake dimension (number-average), especially the mean flake length (number-average), of the recycled wood flakes (and any virgin wood flakes) present in the core layer fraction 420 is greater than the mean flake dimension (number-average), especially the mean flake length (number-average), of the recycled wood flakes present (and of any virgin wood flakes present) in the fines fraction 421. For removal of dusts or a superfines fraction 460, the fine layer fraction can optionally be sent to an appropriate classifying apparatus 450, for example a screening apparatus, in order to obtain a fines fraction 422 that has been very substantially freed of dusts, which can preferably be used for the purposes of the present invention. The dusts can, for example, be utilized thermally or be utilized for chipboard production.

The surface layer fraction 410 is fed to a binder apparatus 310 and provided with binder therein. It is also possible to separately meter strands into the binder apparatus 310, for example from the drying apparatus 501 which is not shown in FIG. 5. The surface layer fraction 410 that has been provided with binder is introduced into the two scattering apparatuses 111, 112 and scattered there to give the respective surface layer mats 11', 12'.

The apparatus according to FIG. 5 comprises two further binder apparatuses 320, 322, of which, in the case of production of a three-layer oriented strand board, only the binder apparatus 320 is operated; in the case of production of a five-layer oriented strand board, both binder apparatuses 320, 322 are operated.

If a three-layer oriented strand board is produced, the flow diagram shown by solid lines starting from the binder apparatuses 310, 320, 322 is utilized, and in the case of production of a five-layer oriented strand board the flow diagram shown by dotted lines. First of all, the production of a three-layer oriented strand board by the apparatus shown in FIG. 5 is elucidated in detail. The core layer fraction 420 is sent to the binder apparatus 320. At the same time, the fines fraction 422 (or, if the fines fraction 421 is not classified further (450), the fines fraction 421) is introduced into the binder apparatus 320. The combined fractions 420 and 422 (or 421) are glued in the binder apparatus 320 and then introduced into the scattering apparatus 122 for production of the core layer mat 20' (the only one in this case). The two scattering apparatuses 121 and 123 and likewise the binder apparatus 322 are not supplied with flake mixtures.

For production of a five-layer oriented strand board, only the core layer fraction 420 is introduced into the binder apparatus 320, then the core layer fraction that has been provided with binder is introduced in equal portions into each of the scattering apparatuses 121, 123 for scattering of the respective outer core layer mats 21', 23'. The fines fraction 422 (or, if the fines fraction 421 is not classified further (450), the fines fraction 421) is introduced into the binder apparatus 322, then the fines fraction 422 or 421 that has been provided with binder is introduced into the scattering apparatus 122 and the inner core layer mat 22' is produced.

In each case, the scattered particle mat produced, as described in FIG. 3, is sent to the press 200 for production of the oriented strand board.

To clarify the use of and to hereby provide notice to the public, the phrases "at least one of <A>, <B>, ... and <N>" or "at least one of <A>, <B>, <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, or N including any one element alone or the one element in combination with one or more of the other elements which may also include, in combination, additional elements not listed. Unless otherwise indicated or the context suggests otherwise, as used herein, "a" or "an" means "at least one" or "one or more."

LIST OF REFERENCE NUMERALS 11 upper surface layer
12 lower surface layer
20 core layer
21, 23 outer core layer
22 inner core layer
11' upper surface layer mat
12' lower surface layer mat
20' core layer mat
21', 23' outer core layer mat
22' inner core layer mat
111, 112, 120, 121, 122 scattering apparatuses
200 press
310, 320, 322 binder apparatuses
400 classifying apparatus for flake mixture
410 surface layer fraction
420 core layer fraction, outer core layer fraction
421 fines fraction for further classification
422 fines fraction, inner core layer fraction
450 classification apparatus for fines fraction 421
460 wood dust/superfines fraction
500, 501, 502 drying apparatus
600 mixing bunker
601 feeding option for virgin wood flakes
700 OSB flaker
800 flaking apparatus for recycled wood/virgin wood chips
850 classifying apparatus for recycled wood flakes
851 fines fraction of recycled wood flakes
852 midsize fraction of recycled wood flakes
853 coarse fraction of recycled wood flakes
905 pneumatic sorting
910 magnet
920 eddy current sorter
930 gravimetric sorting
940 x-ray sorting/video sorting
950 wood dust
951 fines fraction of chips
952 middle fraction of chips
953 coarse fraction of chips
954 introduction option for virgin wood chips
1000 chopper
1100 crusher

The invention claimed is:

1. An oriented strand board comprising:
an upper surface layer having wood material consisting of a mixture of recycled wood flakes and oriented strands bonded together by a binder, wherein the proportion by weight of the oriented strands predominates over the proportion by weight of the recycled wood flakes in the upper surface layer,
three core layers comprising or being formed from a mixture of recycled wood flakes with strands from virgin fiber wood bonded together by a binder,
a lower surface layer having wood material consisting of a mixture of recycled wood flakes and oriented strands bonded together by a binder, wherein the proportion by weight of the oriented strands predominates over the proportion by weight of the recycled wood flakes in the lower surface layer,
wherein the three core layers are arranged between the upper surface layer and the lower surface layer;
wherein the strands present in the upper surface layer and/or in the lower surface layer are from virgin fiber wood,
wherein the proportion of recycled wood flakes in the surface layers is less than the proportion of recycled wood flakes in the core layers,
wherein the three core layers comprise an inner core layer enclosed by two outer core layers,
wherein a proportion by weight of the recycled wood flakes in the inner core layer is greater than in the outer core layers, and
wherein a proportion by weight of the strands having a smaller mean length (number-average) compared to the strands in the upper and lower surface layers is less in the inner core layer than in the outer core layers,
wherein a proportion by weight of the recycled wood flakes obtained in the inner core layer, based on the sum of all strands and flakes in the inner core layer, is 50 to 90% by weight, and
wherein a proportion by weight of the recycled wood flakes in the outer core layers, based on all the flakes in the outer core layers, is 20 to 80% by weight.

2. The oriented strand board of claim 1, wherein the strands present in the three core layers have a smaller mean length (number-average) than the strands present in the upper and lower surface layers.

3. The oriented strand board of claim 1, wherein
a proportion by weight of the recycled wood flakes obtained in the inner core layer, based on the sum of all strands and flakes in the inner core layer, is 60 to 85% by weight, and/or
a proportion by weight of the recycled wood flakes in the outer core layers, based on all the flakes in the outer core layers, is 30 to 70% by weight.

4. The oriented strand board of claim 1, wherein the strands in the outer core layers are arranged transverse to the orientation of the oriented strands in the surface layers.

5. The oriented strand board of claim 1, wherein the strands present in the upper and/or lower surface layer have a mean length (number-average) of 40 to 250 mm and/or a mean thickness (number-average) of 0.3 to 1.5 mm.

6. The oriented strand board of claim 1, wherein the recycled wood flakes have a mean length (number-average) of 5 to 50 mm, a mean width (number-average) of 0.2 to 10 mm, and/or a mean thickness (number-average) of 0.3 to 2 mm.

7. The oriented strand board of claim 1, wherein the strands present in the three core layers have a mean length (number-average) of 10 to 150 mm, a mean width (number-average) of 0.5 to 30 mm, and/or a mean thickness (number-average) of 0.3 to 1.5 mm, wherein the mean length (number-average) is less than that of the strands present in the upper and/or lower surface layers.

8. The oriented strand board of claim 1, wherein the strands present in the upper surface layer and in the lower surface layer are oriented with respect to a longitudinal axis of the oriented strand board such that at least 60% of the strands deviate in their longitudinal alignment by not more than 20° from a longitudinal direction of the oriented strand board.

9. The oriented strand board of claim 1, wherein the oriented strands in the upper surface layer are oriented in the same manner as in the lower surface layer.

10. The oriented strand board of claim 1, wherein the total thickness of the oriented strand board is 4 to 100 mm.

11. The oriented strand board of claim 1, wherein
the thickness of the upper and lower surface layers makes up 20% to 60% of the total thickness of the oriented strand board; and/or
the thickness of the three core layers makes up 80% to 40% of the total thickness of the oriented strand board.

12. The oriented strand board of claim 1, wherein the apparent density of the oriented strand board is 450 to 750 kg/m3.

13. The oriented strand board of claim 1, wherein the binder used for binding of the recycled wood flakes is selected from the group consisting of binders based on polymeric diphenylmethane diisocyanate (PMDI), melamine-formaldehyde-urea-based binders (MUF), melamine-urea-phenol-formaldehyde binders (MUPF), phenol-formaldehyde-based binders, natural binders, starch-based binders, protein-based binders, binders based on tannin, lignin or carbohydrates that have been degraded down to monomers, thermoplastic or crosslinked thermoplastic adhesives, and mixtures and combinations thereof.

14. A process for producing the oriented strand board of claim 1, the process comprising:
producing a scattered particle mat by;
producing a first surface layer mat having wood material consisting of recycled wood flakes, strands, and a binder by oriented scattering of a flake mixture consisting of recycled wood flakes and strands that have been provided with binder, wherein the proportion by weight of the strands predominates over the proportion by weight of the recycled wood flakes in the first surface layer mat,
scattering three core layer mats arranged one on top of another, the three core layer mats comprising or being formed from a mixture of flakes which have been obtained by flaking of recycled wood (RW) and strands which have been obtained by flaking of virgin fiber wood, wherein the flakes and the strands have been bonded together by a binder and have been provided with the binder to the first surface layer mat,
producing a second surface layer mat having wood material consisting of recycled wood flakes and strands that have been provided with binder on the three core layer mats by oriented scattering of a flake mixture consisting of recycled wood flakes and strands that have been provided with a binder, wherein the proportion by weight of the strands predominates over the proportion by weight of the recycled wood flakes in the second surface layer mat; and
pressing the scattered particle mat, for hardening and solidification of the binder, at an elevated temperature relative to standard conditions;
wherein the strands present in the first surface layer mat and/or in the second surface layer mat are from virgin fiber wood,
wherein the proportion of recycled wood flakes in the surface layer mats is less than the proportion of recycled wood flakes in the core layers,
the three core layers comprising an inner core layer mat enclosed by one outer core layer mat on each side,
wherein a proportion by weight of the recycled wood flakes in the inner core layer mat is greater than in the outer core layer mats, and
a proportion by weight of the strands having a smaller mean length (number-average) compared to the strands in the first and second surface layer mats is less in the inner core layer mat than in the outer core layer mats.

15. An apparatus for the production of the oriented strand board of claim 1, the apparatus comprising:
at least one scattering apparatus for production of a first surface layer mat, having wood material consisting of recycled wood flakes and oriented strands that have been provided with binder;
at least three scattering apparatuses for production of three core layer mats on the first surface layer mat, wherein the at least three scattering apparatuses is preceded upstream by at least one binder apparatus for application of a binder to the flakes of the three core layer mats;
at least one scattering apparatus for production of a second surface layer mat having wood material consisting of recycled wood flakes and oriented strands that have been provided with binder on the three core layer mats,
wherein the at least one scattering apparatus for production of the first and the second surface layer mat is preceded upstream by a common binder apparatus for application of a binder to the flakes of the surface layer mats or by one separate binder apparatus for each; and
a press, arranged downstream of the scattering apparatuses, for pressing of the scattered particle mat at elevated temperature relative to standard conditions; and
a) at least one classifying apparatus, connected upstream of the scattering apparatuses, for production of a surface layer fraction, a core layer fraction and optionally a fines fraction is included, wherein the surface layer fraction produced is sent in each case to the at least one scattering apparatus for production of a first and second surface layer mat, and the core layer fraction and optionally the fines fraction are sent to the at least three scattering apparatuses for production of the three core layer mats, and
the at least one classifying apparatus is preceded upstream by at least one mixing bunker for mixing of strands and recycled wood flakes; and/or
b) each at least one scattering apparatus for production of the first and second surface layer mat is preceded upstream by a flaking apparatus for production of strands from virgin wood (VW), and
the at least three scattering apparatuses for production of three core layer mats is preceded upstream by at least one apparatus for flaking of recycled wood (RW) to obtain recycled wood flakes.

16. The oriented strand board of claim 1, wherein the oriented strand board fulfills all mechanical properties set out for oriented strand boards by DIN EN 300:2006.

* * * * *